(12) United States Patent
Miya

(10) Patent No.: US 6,739,421 B1
(45) Date of Patent: May 25, 2004

(54) ELECTRICALLY POWERED TWO-WHEELED VEHICLE

(75) Inventor: Naoki Miya, Tokyo (JP)

(73) Assignee: Takara Co., Ltd., Tokyo (JP)

( * ) Notice: Subject to any disclaimer, the term of this patent is extended or adjusted under 35 U.S.C. 154(b) by 0 days.

(21) Appl. No.: 10/428,570

(22) Filed: May 3, 2003

(30) Foreign Application Priority Data

Mar. 4, 2003 (JP) .................................. 2003-057440

(51) Int. Cl.$^7$ ................................. B62D 6/02

(52) U.S. Cl. .................. 180/220; 180/205; 280/278

(58) Field of Search ................. 180/205, 206, 180/207, 220, 65.1; 280/278, 287

(56) References Cited

U.S. PATENT DOCUMENTS 5,318,144 A * 6/1994 Berlinger, Jr. .............. 180/208
2003/0141121 A1 * 7/2003 Flowers et al. ............ 180/65.1

FOREIGN PATENT DOCUMENTS

FR 2768990 A1 * 4/1999 .......... B62M/23/02
JP 2588718 11/1998

* cited by examiner

Primary Examiner—Daniel G. DePumpo

(57) ABSTRACT

A frame 3 is divided at a substantial center portion thereof into a front frame part and a back frame part. The two frame parts are joined by a hinge portion 25 so that the divided frame can be folded in two. The frame 3 is provided with detection device 30 for detecting whether or not the frame 3 has been folded at the hinge portion 25. The motor 2 becomes inoperable when the detection device 30 detects the folding of the frame 3.

4 Claims, 4 Drawing Sheets

ELECTRICALLY POWERED TWO-WHEELED VEHICLE

BACKGROUND OF THE PRESENT INVENTION

1. Field of the Present Invention

The present invention relates generally to an electrically powered two-wheeled vehicle, and more particular to an electrically powered two-wheeled vehicle that can be folded in two and that, when folded, makes a motor inoperable so as to prevent the vehicle from inadvertently traveling as a result of the motor being turned on.

2. Description of the Related Art

Conventionally, two-wheeled vehicles mounted with a small engine have been common, but only recently have electrically powered two-wheeled vehicles that travel using a motor as a power source been proposed. Such electrically powered two-wheeled vehicles travel by charging a battery with a household power source and then activating a motor using the battery, and have attracted attention as clean, next-generation vehicles that do not emit exhaust.

However, there is a limit to the distance that such vehicles can travel with one charge of the battery, and therefore the electrically powered two-wheeled vehicles cannot travel long distances. Thus, it is necessary to load such a vehicle in an automobile so that it can be taken to a destination and then used there. In order to be able to load an electrically powered two-wheeled vehicle into the automobile, a foldable electrically powered two-wheeled vehicle has been proposed in e.g., Japanese Patent Application Laid-Open Publication (JP-A) No. 2001-278161 (see p. 7, FIG. 1), in which the electrically powered two-wheeled vehicle can be made compact by dividing a frame into two and folding the frame.

However, electrically powered two-wheeled vehicles are commonly based on the prerequisite that the motor cannot be activated when the frame has been divided in two and folded. When a kickstand is used in a traveling mode, i.e., in a mode in which the frame is not folded, the electrically powered two-wheeled vehicle idles even if the motor is accidentally activated because the rear wheel does not contact the ground. However, when the frame is folded and the motor is accidentally activated, there has been the possibility of the electrically powered two-wheeled vehicle inadvertently traveling because the rear wheel and the front wheel contact the ground.

Also, it is believed that turning the headlight on during travel leads to preventing accidents during travel, and therefore the electrically powered two-wheeled vehicle travels with the headlight turned on. In the prior art, however, it has been necessary for the user to operate a headlight turn-on switch in order to turn the headlight on.

SUMMARY OF THE PRESENT INVENTION

It is therefore an object of the present invention to solve the above problems and to provide an electrically powered twowheeled vehicle allowing for safety so that a motor is not activated even if a power key of the electrically powered two-wheeled vehicle folded for transport or storage is accidentally turned on.

In order to achieve the object, according to an aspect of the present invention there is provided an electrically powered two-wheeled vehicle using a motor as a power source and including a front part and a rear part, the electrically powered two-wheeled vehicle comprising a frame that is divided at a substantially center portion thereof into a front frame part and a rear frame part; and a hinge portion that joins the front and rear frame parts so that the divided frame can be folded in two, wherein the frame is provided with detection means for detecting whether or not the frame has been folded at the hinge portion, whereby the motor is made inoperable when the detection means detects the folding of the frame.

The detection means preferably comprises contact points that are disposed respectively at two divided surfaces, the contact points being in contact with each other for electric conduction when the frame is not folded, the contact points being out of contact with each other when the frame is folded, with the motor becoming inoperable when the contact points are not in contact with each other so that the motor is not activated when the frame is folded.

The detection means may comprise a switch disposed at one of the two divided surfaces, the switch being turned on when the frame is not folded, the switch being turned off when the frame is folded, with the motor becoming inoperable when the switch is off so that the motor is not activated when the frame is folded.

Also, in the electrically powered two-wheeled vehicle, a headlight and a taillight may be forcibly turned on when the electrically powered two-wheeled vehicle travels using the motor as a power source, so that safety during travel is improved.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE PREFERRED EMBODIMENT

Figure 1:
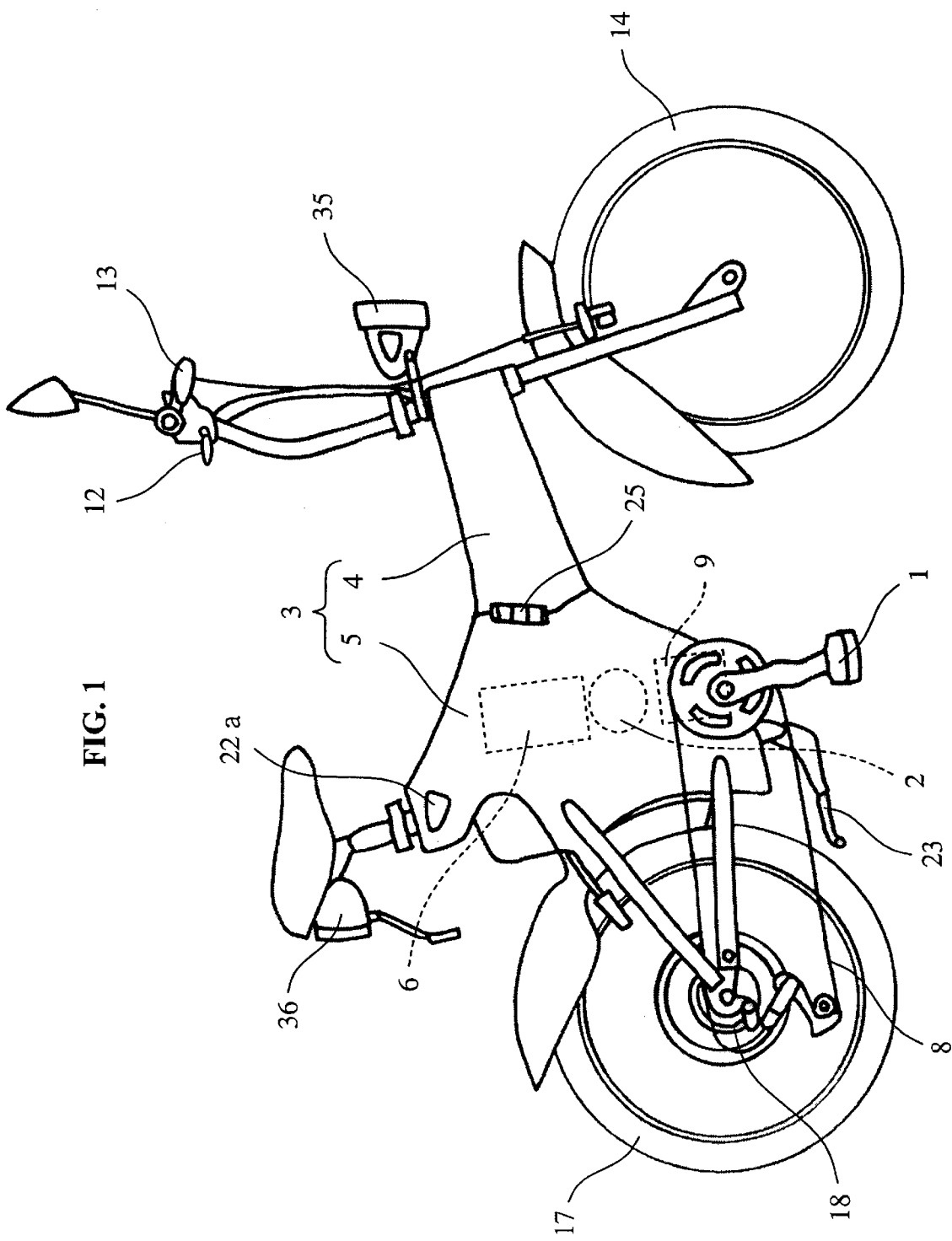
FIG. 1 is a side view of an electrically powered two-wheeled vehicle according to the present invention.
Figure 2:
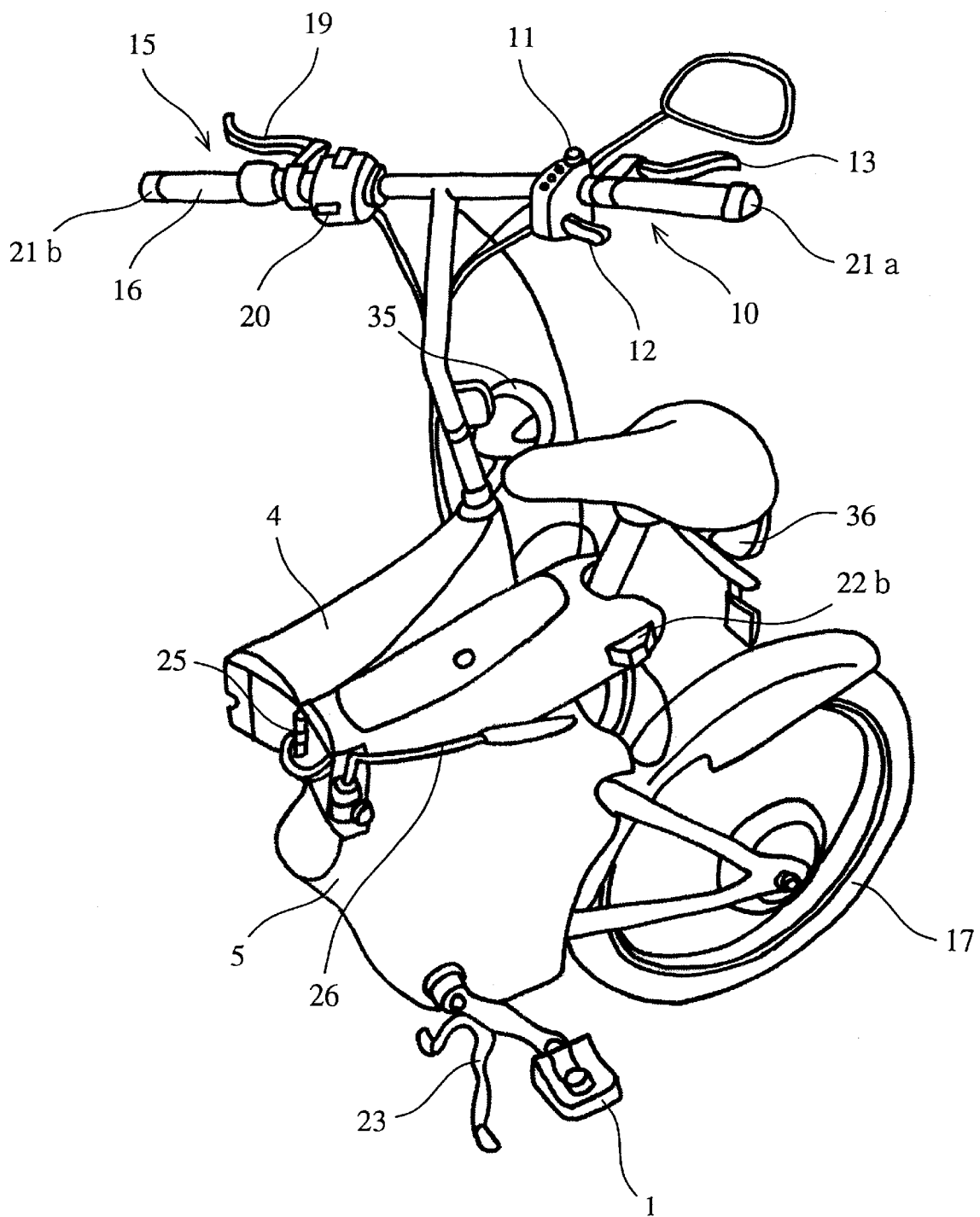
FIG. 2 is a perspective view illustrating the state where the electrically powered two-wheeled vehicle is folded.

FIG. 1 shows an example of an electrically powered two-wheeled vehicle according to the present invention. The electrically powered two-wheeled vehicle is of a type enabling an optional selection to be made between human powered travel, in which pedals 1 are worked, and electrically powered travel, in which a motor 2 is activated. When the electrically powered two-wheeled vehicle is not in use or is being transported, a frame 3 can be folded in two, as shown in FIG. 2.

In this electrically powered two-wheeled vehicle, as is well known, when a power key 11 disposed at the right side of a handle 10 is turned on, the motor 2 is activated, and an accelerator lever 12 is operated to allow speed regulation. Activating a brake lever 13 enables a brake to be applied to a front wheel 14. When a grip 16 disposed at the left side of the handle 10 is turned, switching of a gearshift 18 of a rear wheel 17 is conducted, whereby speed can be regulated. When a brake lever 19 is activated, a brake is applied to the rear wheel 17.

Reference numeral 20 denotes a turn signal switch that selectively lights up turn signal lights 21a and 21b, which are disposed at right and left sides of the handle 10, and turn signal lights 22a and 22b, which are disposed at right and left sides of the frame 3. Reference numeral 23 indicates a kickstand.

The frame 3 is divided into a front frame 4 and a rear frame 5. The front frame 4 is provided with the handle 10 and the front wheel 14. The rear frame 5 is provided with the pedals 1, the motor 2, a battery 6, the rear wheel 17, and a drive mechanism 9 which is well known per se, the drive mechanism causing the rear wheel 17 to rotate using the motor 2 as power and driving a chain 8.

The front frame 4 and the rear frame 5 are pivotably joined by a hinge portion 25 and can be folded at the hinge portion 25. A well-known lock mechanism is also provided, with which the front frame 4 and the rear frame 5 can be locked by swinging a lock lever 26 backwards when the front frame 4 and the rear frame 5 are not folded.

Detection means 30 is disposed at divided surfaces of the frame 3 to detect whether the frame 3 has been folded in two or is not folded.

Figure 3A:
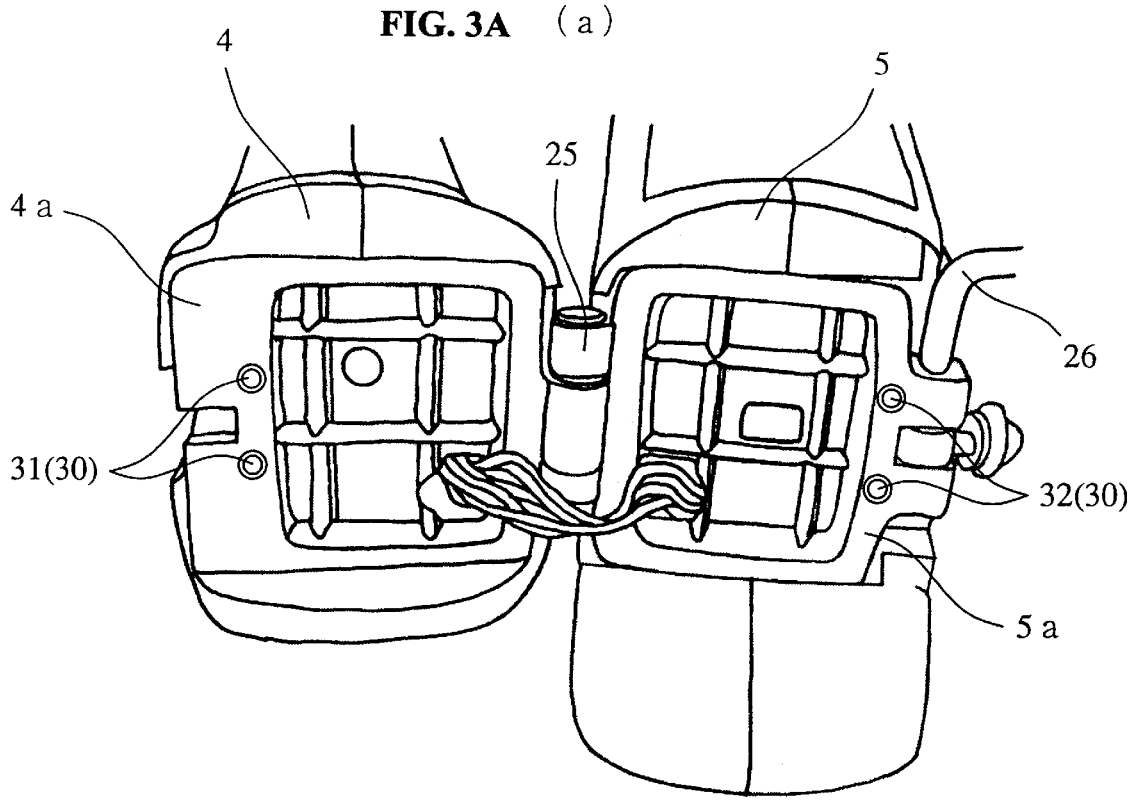
FIGS. 3A and 3B are perspective views illustrating joint surfaces of a frame.
Figure 3B:
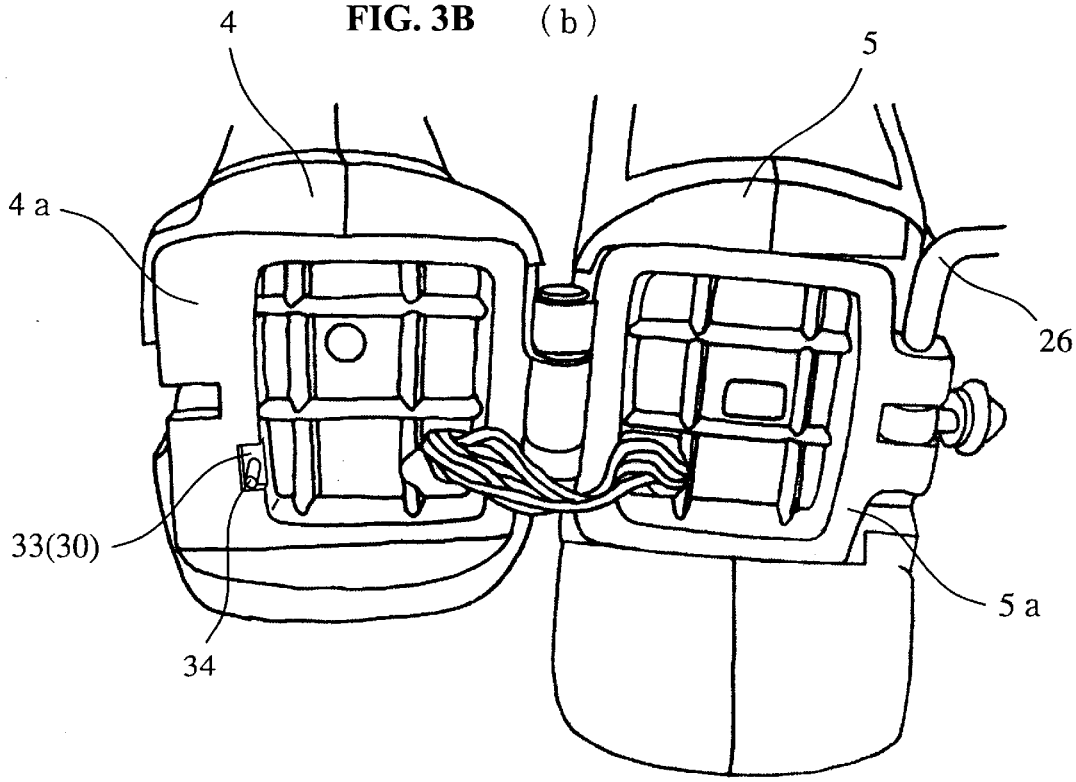

As shown in FIG. 3A, the detection means 30 is comprised of contact points 31 and 32 that are disposed on joint surfaces 4a and 5a, respectively, and insulated from the frame 3 with insulating material. It should be noted that, as shown in FIG. 3B, the detection means 30 may also be comprised of a switch 33 so that a button 34 of the switch 33 is pushed by the joint surface 5a and the switch 33 is turned on when the joint surfaces 4a and 5a abut against each other.

In a case where the detection means 30 is comprised of the contact points 31 and 32, when the frame 3 is not folded (hereinafter referred to as a traveling mode), the contact points 31 and the contact points 32 abut against each other and conduct electricity, whereby the motor 2 becomes operable. When the frame 3 is folded (hereinafter referred to as a storage mode), the contact points 31 and the contact points 32 are not in contact, and a drive circuit of the motor 2 is formed so that the motor 2 is inoperable. In a case where the detection means 30 is comprised of the switch 33, when the electrically powered two-wheeled vehicle is in the traveling mode in which the frame 3 is not folded, the switch 33 is turned on, whereas when the frame 3 is in the folded storage mode, the switch 33 is turned off. When the switch 33 is turned off, a drive circuit of the motor 2 is formed so that the motor 2 is inoperable. In this manner, by forming the electrically powered two-wheeled vehicle so that the drive circuit of the motor 2 is not established in the storage mode, the motor 2 cannot be turned on even if the power key 11 is accidentally operated. Thus, the rear wheel 17 does not rotate, making it possible to prevent 25 such trouble as the rear wheel 17 rotating and the electrically powered two-wheeled vehicle inadvertently traveling in the state where the kickstand 23 has been put down and the rear wheel 17 contacts the ground.

Also, in this embodiment, the headlight 35 and the taillight 36 are turned on and off in association with the power key 11 being turned on and off in the traveling mode. During electrically powered traveling when the motor 2 is activated for travel, the headlight 35 and the taillight 36 are forcibly turned on.

Figure 4:
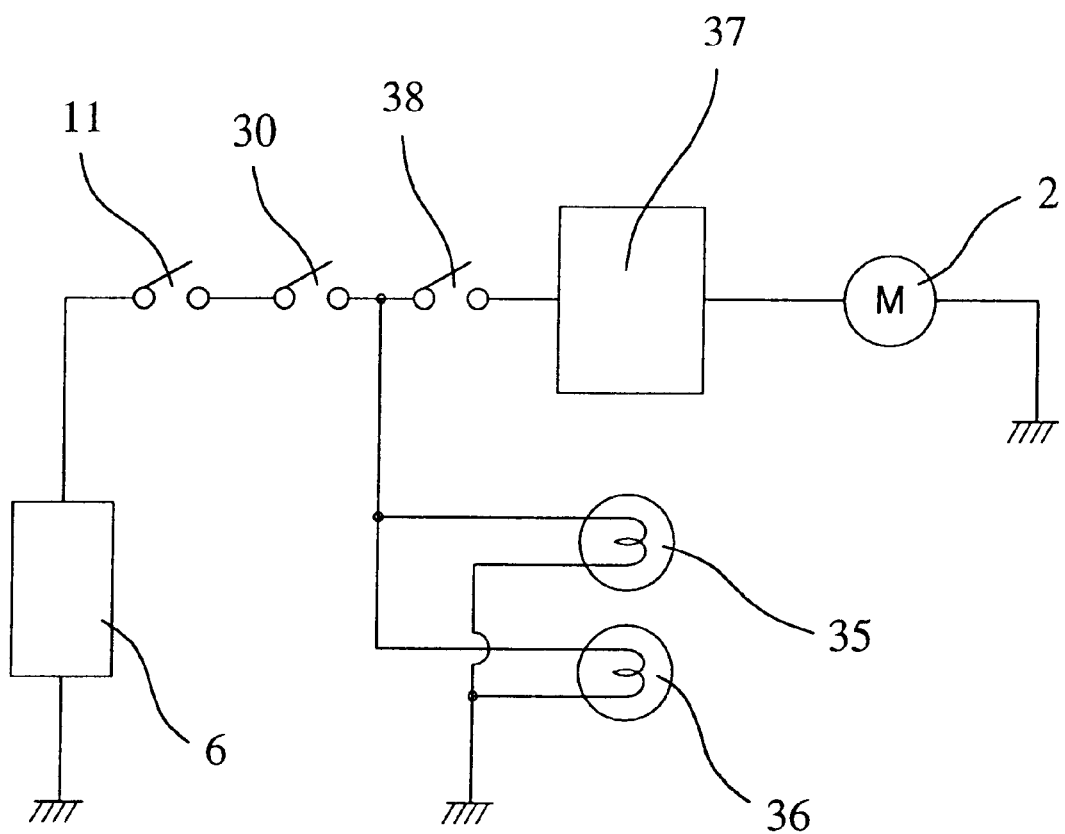
FIG. 4 is a block diagram illustrating a concept of the relation between a motor, a headlight, a taillight, and detection means.

FIG. 4 shows a block diagram illustrating a concept of the relation between the motor 2, the headlight 35, the taillight 36, and the detection means 30. The power key 11, the detection means 30, and a brake switch 38 are disposed in series between the battery 6 and a control circuit 37 that controls the activation of the motor 2. In order to activate the motor 2, it is necessary for the frame 3 to be in the traveling mode, for the power key 11 to be turned on, and for the brakes not to be applied. If even one of these conditions is lacking, the motor 2 will not be activated.

Also, because the headlight 35 and the taillight 36 are connected to the battery 6 via the power key 11 and the detection means 30, the headlight 35 and the taillight 36 are automatically lit up by the frame 3 being in the traveling mode and the power key 11 being turned on. If the frame 3 is not in the traveling mode, the headlight 35 and the taillight 36 will not be lit up even if the power key 11 is turned on.

As described above, according to the electrically powered two-wheeled vehicle of the present invention, in the storage mode where the frame 3 is folded, the detection means 30 does not recognize that the frame 3 is in the traveling mode even if the power key 11 is turned on, with the result that the motor 2 is not activated. Therefore, in the state where the frame 3 is folded and the kickstand 23 is down with the rear wheel 17 contacting the ground (See FIG. 2), the motor 2 is not activated even if the power key 11 is accidentally turned on. Thus, it is possible to prevent beforehand accidents resulting from inadvertent traveling.

Also, in the embodiment, because the headlight 35 and the taillight 36 are forcibly turned on when the power key 11 is turned on in the traveling mode (the state where the frame 3 is not folded), there is no electrically powered travel in which the user has forgotten to turn on the headlight 35 and the taillight 36, thus securing safety during traveling.

According to the present invention, the detection means recognizes the folded state when the frame is folded, so that the motor is not activated even if a user accidentally operates the power key, thus making it possible to prevent inadvertent traveling resulting from a mistaken operation and to prevent any trouble from occurring.

While the illustrative and presently preferred embodiment of the present invention has been described in detail herein, it is to be understood that the inventive concepts may be otherwise variously embodied and employed and that the appended claims are intended to be construed to include such variations except insofar as limited by the prior art.

What is claimed is:

1. An electrically powered two-wheeled vehicle using a motor as a power source and including a front frame part and a rear frame part, the electrically powered two-wheeled vehicle comprising:

a frame that is divided at a substantially center portion thereof into said front frame part and said rear frame part; and a hinge portion that joins said front and rear frame parts so that the divided frame can be folded in two, wherein the frame is provided with detection means for detecting whether or not the frame has been folded at the hinge portion, whereby the motor is made inoperable when the detection means detects the folding of the frame.

2. The electrically powered two-wheeled vehicle according to claim 1, wherein the detection means comprises contact points disposed respectively at two divided surfaces, the contact points being in contact with each other for electric conduction when the frame is not folded, the contact points being out of contact with each other when the frame is folded, with the motor becoming inoperable when the contact points are not in contact.

3. The electrically powered two-wheeled vehicle according to claim 1, wherein the detection means comprises a switch disposed at one of the two divided surfaces, the switch being turned on when the frame is not folded, the switch being turned off when the frame is folded, with the motor becoming inoperable when the switch is off.

4. The electrically powered two-wheeled vehicle according to claim 1, wherein a headlight and a taillight are forcibly turned on when the electrically powered two-wheeled vehicle travels using the motor as a power source.

* * * * *